(12) United States Patent
Chatterjee

(10) Patent No.: US 9,304,758 B2
(45) Date of Patent: Apr. 5, 2016

(54) MODIFICATION OF TERMINAL AND SERVICE PROVIDER MACHINES USING AN UPDATE SERVER MACHINE

(71) Applicant: Shuv Gray LLC, Foster City, CA (US)

(72) Inventor: Sandeep Chatterjee, Foster City, CA (US)

(73) Assignee: S3G Technology LLC, Foster City, CA (US)

( * ) Notice: Subject to any disclaimer, the term of this patent is extended or adjusted under 35 U.S.C. 154(b) by 0 days.

(21) Appl. No.: 14/788,506

(22) Filed: Jun. 30, 2015

(65) Prior Publication Data

US 2015/0301820 A1 Oct. 22, 2015

Related U.S. Application Data

(63) Continuation of application No. 14/060,490, filed on Oct. 22, 2013, now Pat. No. 9,081,897, which is a continuation of application No. 12/841,113, filed on Jul. 21, 2010, now Pat. No. 8,572,571.

(60) Provisional application No. 61/325,212, filed on Apr. 16, 2010, provisional application No. 61/228,140, filed on Jul. 23, 2009.

(51) Int. Cl.
*G06F 9/44* (2006.01)
*G06F 3/00* (2006.01)
*G06F 9/445* (2006.01)
(Continued)

(52) U.S. Cl.
CPC .............. *G06F 8/65* (2013.01); *G06F 9/4443* (2013.01); *G06F 11/3664* (2013.01); *H04W 4/003* (2013.01)

(58) Field of Classification Search
CPC ....... H04W 4/027; H04W 4/02; H04W 64/00; G06F 21/88; G06F 8/65; G06F 8/34; G06F 8/38; G06F 11/3664
See application file for complete search history.

(56) References Cited

U.S. PATENT DOCUMENTS 6,047,327 A 4/2000 Tso et al.
6,574,791 B1 6/2003 Gauthier et al.
6,668,368 B1 12/2003 Hernandez, III
(Continued)

OTHER PUBLICATIONS

Stewart et al., Transition relevance place: a proposal for adaptive user interface in natural language dialog management systems, Apr. 2006, 6 pages.*

(Continued)

*Primary Examiner* — Thuy Dao
(74) *Attorney, Agent, or Firm* — Morgan, Lewis & Bockius LLP

(57) ABSTRACT

A system including a terminal machine and a service provider machine is modified using a service provider machine. The terminal machine includes a terminal application for displaying a prompt in a first sequence of prompts and accepting a user data entry in a first series of data entries. The service provider machine includes a provider application for receiving the user data entry. The update server machine sends a dialog module including a first and second set of updated code to the terminal machine and the service provider machine, respectively. The dialog module does not modify computer-executable instructions saved on the terminal or service provider machines. The first and second set of updated code adapts the terminal application and provider application, respectively, to use a second sequence of prompts and a second sequence of data entries.

23 Claims, 15 Drawing Sheets

(51) Int. Cl.
*H04W 4/00* (2009.01)
*G06F 11/36* (2006.01)

(56) References Cited

U.S. PATENT DOCUMENTS

| | | | |
|---|---|---|---|
| 6,701,514 B1 | 3/2004 | Haswell et al. | |
| 7,185,334 B2 | 2/2007 | Bourke-Dunphy et al. | |
| 7,343,550 B2 | 3/2008 | Saidenberg et al. | |
| 7,594,219 B2 | 9/2009 | Ramachandran et al. | |
| 7,827,545 B2 | 11/2010 | Choe et al. | |
| 7,930,182 B2 * | 4/2011 | Sinai | G06F 8/38 704/231 |
| 8,056,070 B2 * | 11/2011 | Goller | G06F 8/65 704/231 |
| 8,307,294 B2 * | 11/2012 | Luo | G06F 8/34 715/762 |
| 8,347,267 B2 | 1/2013 | Givoni et al. | |
| 8,448,160 B2 | 5/2013 | Vincent et al. | |
| 8,572,571 B2 | 10/2013 | Chatterjee | |
| 8,977,951 B2 * | 3/2015 | Ethier | G06F 3/0484 715/222 |
| 9,158,508 B2 * | 10/2015 | Eldridge | G06F 3/0486 |
| 2003/0022677 A1 | 1/2003 | Piikivi | |
| 2004/0205720 A1 | 10/2004 | Hundt | |
| 2004/0242209 A1 | 12/2004 | Kruis et al. | |
| 2005/0065995 A1 | 3/2005 | Milstein et al. | |
| 2005/0102664 A1 | 5/2005 | Eyres et al. | |
| 2006/0069568 A1 * | 3/2006 | Passaretti | G10L 15/01 704/270 |
| 2006/0073820 A1 | 4/2006 | Craswell et al. | |
| 2006/0230379 A1 * | 10/2006 | Pintos | G06F 8/38 717/109 |
| 2007/0240069 A1 * | 10/2007 | Eldridge | G05B 19/0426 715/763 |
| 2009/0171669 A1 * | 7/2009 | Engelsma | G10L 15/22 705/275 |
| 2010/0267345 A1 | 10/2010 | Berton et al. | |
| 2013/0219357 A1 | 8/2013 | Reitan | |

OTHER PUBLICATIONS

Griol et al., Statistical dialog management methodologies for real applications, Sep. 2010, 4 pages.*
Perugini et al., A study of out-of-turn interaction in menu-based, IVR, voicemail systems, Apr. 2007, 10 pages.*
Lohr et al., Mixed-Initiative Dialog Management for Speech-Based Interaction with Graphical User Interfaces, Apr. 2008, 10 pgs.
Paterson, MULTI: Multiple User Interactive Template Installation, Jun. 2007, 1 pg.
Sourcetrace Systems Inc., International Preliminary Report on Patentability, PCT/US2010/042775, Feb. 2, 2012, 6 pgs.
Sourcetrace Systems Inc., International Search Report and Written Opinion, PCT/US2010/042775, Sep. 13, 2010, 6 pgs.

* cited by examiner

| | | |
|---|---|---|
| Logged In As: | admin (AdministratorsName, Administrator) Log Off | |
| Project Name: | DemonstrationScreens | |
| Security Level: | Design and Flows | |
| Runtime Version: | v2.1.36 | |
| Handset Type: | LNP30 | |
| Description: | Point-of-Sale (PoS) Terminal with 8x14 display, alphanumeric data entry, smart card reader, and magnetic swipe card reader. | |
| Language Support: | English, Spanish | |

Project Management (Save Project or Submit Project for Processing)

⬅ Prev Screen

➡ Next Screen

[ Save Project ] | [ Submit Project for Processing ]

Screen: 1 of 6

Title : WelcomeScreen

Screen Design (Design each screen exactly as you would like it to appear)

| # | Language ID: English | Language ID: Spanish |
|---|---|---|
| 1 | Welcome to the | Recepción al |
| 2 | eServices Everywhere | eServices por todas partes |
| 3 | Mobile Designer Extreme | Extremo Móvil Del Diseñaor |
| 4 | | |
| 5 | | |
| 6 | | |
| 7 | | |
| 8 | Press ENTER to continue | Presione ENTRAN para continuar |
| 9 | | |

FIG. 8A

Screen Flows (Select the keys and the destination screen of the user pressing that key)

1 to 0   2 to 0   3 to 0   4 to 0   5 to 0

6 to 0   7 to 0   8 to 0   9 to 0   0 to 0

FUNC to 0   ALPHA to 0   ENTER to 2

Data Entry Screen (Check which type of data can be entered on this screen.)

● None   ○ Alpha Only   ○ Numeric Only   ○ Alphanumeric
○ Smart Card   ○ Magnetic Swipe Card   ○ Touchscreen

Data Entry Validation (Specify the rules and validation on the entered data.)

Handler Name: MappingForCostaRicaDi

Notes: (Enter any notes or special handling instructions)

MappingForCostaRicaDistricts:

FIG. 8B

MODIFICATION OF TERMINAL AND SERVICE PROVIDER MACHINES USING AN UPDATE SERVER MACHINE

CROSS REFERENCE TO RELATED APPLICATIONS

This application is a continuation of U.S. patent application Ser. No. 14/060,490, filed Oct. 22, 2013, which is a continuation of U.S. patent application Ser. No. 12/841,113, filed Jul. 21, 2010, now U.S. Pat. No. 8,572,571, issued Oct. 29, 2013, which claims the benefit under 35 USC 119(e) of U.S. Provisional Patent Application No. 61/325,212, filed Apr. 16, 2010, and U.S. Provisional Patent Application No. 61/228,140, filed Jul. 23, 2009, the disclosures of which are hereby incorporated by reference in their entireties.

BACKGROUND

1. Field of Invention

This application relates generally to a computerized system to provide efficient modification of remote software and, more specifically, to adaptation and customization of a computer transaction dialogue module.

2. Description of the Related Art

It is well known to those of skill in the art that computerized systems can be adapted to perform specific functionality by implementing software code. For example, the software code may be written in languages such as C, C++, or Java.

A computerized system may be constructed, which includes electronic hardware, one or more computer processors, and software, which is able to perform system functionality. Typically, the software is written or created as source code and later compiled or converted into computer-executable instructions able to be read and executed by a computer processor without additional translation or adaptation. For example, the source code may be written in languages such as C, C++, or Java. Computer-executable instructions are sometimes also referred to as executable code or machine code.

For example, the computer-executable instructions may be compiled for and executed on a specific computer processor, such as the Intel Pentium processor from Intel Corporation, or may be used to modify the functionality of a Programmable Gate Array (PGA) or Field Programmable Gate Array (FPGA), such as those provided by Xilinx Corporation. In most cases, computer-executable code is specific to one type of processor or logical device.

Virtual machines can be used to provide a method of executing code on a computer system that is not dependent on a specific processor or hardware configuration. When using a virtual machine, a portion of code (typically in the form of source code) is compiled or translated into intermediary code, such as Java Byte Code. The intermediary code is then able to be further translated using the virtual machine, which itself is run on a computer processor (and perhaps also an operating system). Thus, a virtual machine is able to emulate a standardized computer platform that is independent of the actual computer processor or hardware configuration.

A computerized system, in the context of the embodiments described herein, includes more than one hardware device, each hardware device running a separate software application. Each software application comprises, in part, computer-executable instructions that allow the associated hardware device to interact with a user and communicate with another hardware device over a distributed network. For example, the software application may be adapted to interact directly with a user of the hardware device by accepting user input. The software application may be further adapted to communicate the user input to another hardware device using a network connection.

Oftentimes, after a computerized system has been initially constructed, modifications may be required, either to improve the functionality of the system or to customize the system to meet new requirements. In some cases, these modifications require changes to the software application stored on each system device.

Typically, a software application includes computer-executable instructions that are not able to be edited or modified directly by a developer. Using known methods, the developer may only implement the required changes by creating or editing source code. The updated source code must then be recompiled or translated into an updated set of computer-executable instructions and distributed to the hardware devices in the system as an updated software application. Typically, the updated set of computer-executable instructions that comprises an updated software application includes a relatively large amount of information.

However, in many situations, it may be difficult to distribute a newly compiled version of the updated software application to all of the devices in the system. This is particularly true if the system is distributed over a large geographic area. For example, it may be difficult to locate each system device and transport it to a central location or development center. Because physical access to the devices is not practical, the new software application cannot be uploaded using a traditional wired transmission (e.g., an interface cable).

In some computerized systems, the only practical option may be to upload the updated software application using an existing communication network. However, if the communications network has limited data transmission capabilities, it may be difficult to transmit the large amount of information (e.g., an entire software application). For example, a software application may be initially installed on a wireless mobile device (e.g., a cell phone or PDA). Typically, the device is issued to a user, who may travel or reside far from a software development center. The only method of communicating with the device may be over a wireless telecommunications network. However, due to bandwidth limitations on data transfer over the wireless network, an upload of the entire software application may not be economically feasible. Even if an upload of the application is possible, it may take an unacceptable amount of time due to the slow transfer rate of a wireless network (as compared to a dedicated wired transmission line or cable). These problems are further exacerbated if the computerized system includes a large number of wireless mobile devices, each requiring a separate application upload. Developing and testing separate applications for each mobile device can be time-consuming and economically infeasible. Additionally, if there are different versions of the software application distributed among a large number of mobile devices, a uniform software application update may be difficult to manage and track.

What is needed is a computerized system able to provide efficient modification of software applications that are distributed across a network of remote devices.

SUMMARY

A system including a terminal machine and a service provider machine is modified using a service provider machine. The terminal machine runs a terminal application. The terminal application is able to display a prompt in a first sequence of prompts and accept a user data entry in an associated first sequence of user data entries. The terminal application is comprised of a first set of computer-executable instructions and a first set of code. The service provider machine runs a provider application. The provider application is able to receive the user data entry. The provider application is comprised of a second set of computer-executable instructions and a second set of code.

The update server machine is able to send a dialogue module to the terminal machine and the service provider machine. The dialogue module modifies the first and second set of code to produce a first and second set of updated code, respectively. The dialogue module does not modify the first or second set of computer-executable instructions.

The first set of updated code adapts the terminal application to use a second sequence of prompts and a second sequence of data entries. The second set of updated code adapts the provider application to use the second sequence of prompts and the second sequence of data entries.

DESCRIPTION OF THE FIGURES

FIG. 8A to 8B illustrate examples of a design tool for modifying a system dialogue protocol.

The figures depict one embodiment of the present invention for purposes of illustration only. One skilled in the art will readily recognize from the following discussion that alternative embodiments of the structures and methods illustrated herein can be employed without departing from the principles of the invention described herein.

DETAILED DESCRIPTION

The following embodiments describe a system capable of conducting a transaction between a user at a terminal machine and a service provider at a second, remote machine. In some instances, the system can be used to facilitate a business transaction between a bank or financial institution (using a service provider machine) and a banking customer (using a terminal machine). The structure of the transaction may be custom tailored by adapting a dialogue protocol between at least two machines in the system. The dialogue protocol defines the contours of a transaction and includes various components such as: a sequence of dialogue prompts; a sequence of user data entry fields; and a set of dialogue parameters. Additionally, the dialogue protocol may define aesthetic features including the graphical user interface (GIU), display layout and GUI functionality. The dialogue protocol may be determined by the two software applications running on the two machines engaged in the transaction with the user.

The system described herein allows for the adaptation of a dialogue protocol through the modification of one or more software applications. Specifically, one or more of the software applications may be adapted by including or replacing a dialogue module, which includes a set of code. The code represents at least some information that must be translated by the software application before it can be implemented on the machine processor. In some embodiments, a developer may be able to generate an updated dialogue module as required in accordance with a particular dialogue protocol.

In a preferred embodiment, an updated dialogue module is able to be communicated from an update server machine to individual machine (e.g., devices) in the system, each machine having a software application. In a preferred embodiment, the dialogue module adapts at least one of the software applications to produce a modified dialogue protocol between the system components.

1. Dialogue Updates Using a Three-Node System

Figure 1:
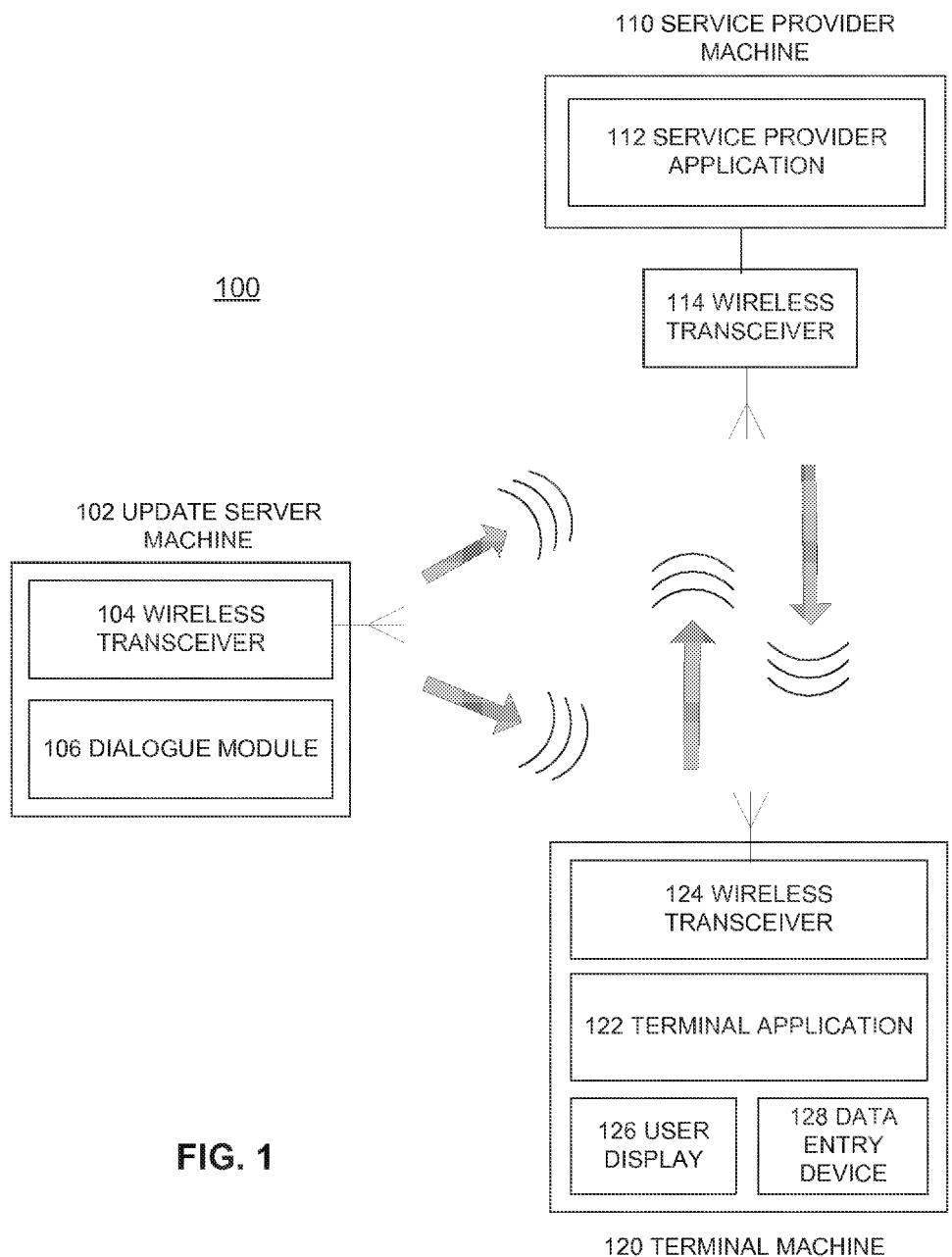
FIG. 1 illustrates a computerized system for updating a dialogue protocol by adapting applications on a terminal machine and a service provider machine.

FIG. 1. depicts an exemplary computerized system for updating a dialogue protocol by adapting applications on a service provider machine 110 and a terminal machine 120. As described above, a transaction may be conducted between a user and the terminal machine 120 and the service provider machine 110. The transaction is conducted according to a dialogue protocol. The dialogue protocol may be changed by communicating a dialogue module 106 from the update server machine 102 to the service provider machine 110 and the terminal machine 120. As described below, the dialogue module 106 may include code that is unique to either the service provider machine 110 or the terminal machine 120. Although they are described separately, the service provider machine 110 and the update server machine 102 may or may not be on the same physical machine.

The system embodiment shown in FIG. 1 provides for communication between a service provider machine 110 and a terminal machine 120. As depicted in FIG. 1, the communication can be facilitated using a wireless communications network between the terminal machine wireless transceiver 124 and a wireless transceiver 114 in communication with the service provider machine 110. In some embodiments, the wireless communications network may be a CDMA or GSM telecommunications network capable of transmitting data between network users. Other components of the system such as wireless base stations, network links, network resource controllers and other components of the wireless communications network are not shown in FIG. 1. In alternative embodiments, the communication may also be transmitted over a wireless communications network that includes a wired network connection or a public switched telephone network (PSTN).

As described above, a specialized communication or transaction occurs between a user and the terminal machine 120 and the service provider machine 110. The transaction may be performed in accordance with a dialogue protocol. In one embodiment, the dialogue protocol is determined, at least in part, by the service provider application 112 (residing on the service provider machine 110) and the terminal application 122 (residing on the terminal machine 120). In a preferred embodiment, the dialogue protocol guides a user through a transaction or series of transactions with a service provider.

The system may conduct a transaction in a continuous communications mode, a delayed communications mode, and a mode that alternates between continuous and delayed communication modes. The mode depends on the availability, performance, or cost of the communication network between the terminal machine 120 and the service provider machine 110.

A system operating in a continuous communications mode transmits and receives data between the terminal machine 120 and the service provider machine 110 at the same time or nearly the same time as a transaction is conducted between the user and a service provider. For example, data that is entered at the terminal machine 120 by a terminal user is typically transmitted to the service provider machine 110 before the user is prompted for additional input. The system may operate in a continuous communications mode if the communication network is available and can provide performance adequate to transfer data between prompts, without causing an appreciable delay in the transaction. One advantage to operating in a continuous communications mode is that transactional information sent by the service provider machine 110 is likely to be more current than if the transactional information had been previously stored on the terminal machine 120.

A system operating in a delayed communications mode stores data input at the terminal machine 120 and transmits the data to a service provider machine 110 at a time that is after a transaction is completed between the user and service provider. For example, a series of prompts may be stored on the terminal machine 120 and used to collect a series of user inputs. The user inputs are stored and then transmitted to the service provider machine 110 at a later time. The system may operate in a delayed communications mode if the communication network is not accessible or reliable at the time of the transaction. An intermittent communications mode may also be used if the communication network is available, but it is advantageous to minimize the number of communications between the terminal machine 120 and the service provider machine 110. Typically, the cost of data transmission over a communications network is lower when the number of transmissions is reduced. Operating in a delayed communications mode may also result in an improved system response because there is little or no delay due to data transmission over the communications network.

A system can also alternate between modes by operating a portion of the time in a continuous communications mode and a portion of the time in a delayed communications mode. For example, a series of data entries may be stored on the terminal machine 120 and then transmitted as a group to the service provider machine 110 before the transaction is complete. By alternating between communications modes, the system may reduce communications costs by minimizing the number of data transmissions. Alternating between communication modes also allows the service provider machine 110 to provide the terminal machine 120 with up-to-date transactional information.

With regard to hardware components used communication using the wireless communications network, the service provider machine 110 may be in communication with a wireless transceiver 114, which is able to send and receive data over the wireless communications network. In some embodiments, the wireless transceiver 114 is separate from the service provider machine 110, and is in communication with the service provider machine 110 using a computer network connection. For example, in some embodiments, the wireless transceiver 114 may be part of a base station in a wireless communications network. In alternative embodiment, the wireless transceiver 114 is dedicated to the service provider machine 110 and/or is connected directly to the service provider machine 110.

The service provider machine 110 also includes a service provider application 112 that is able to direct the service provider machine's portion of the dialogue protocol. Details regarding the service provider application are described in more detail in FIG. 2 below.

The terminal machine 120 may also include a wireless transceiver 124 able to send and receive data over the wireless communications network. The terminal machine 120 also includes a terminal application 122 that is able to direct the terminal machine's portion of the dialogue protocol. Additionally, the terminal machine 120 includes a user display 126 and a data entry device 128 for interacting with a system user. For example, the user display 126 may include a monitor or screen and the data entry device 128 may include a keypad or keyboard. See FIG. 9 for a more detailed description of the components of a terminal machine 120.

Also depicted in FIG. 1, the update server machine 102 communicates with the service provider machine 110 and the terminal machine 120 using the wireless communications network described above. The update server machine 102 may include a wireless transceiver 104 adapted for communication over the wireless communications network. In some embodiments, the wireless transceiver 104 is separate from the update server machine 102, and is in communication with the update server machine 102 using a computer network connection.

The update server machine 102 also includes at least one dialogue module 106. As discussed in more detail below, the dialogue module 106 may include portions of code and/or instructions that are able to modify the dialogue protocol between the terminal machine 120 and the service provider machine 110. In a preferred embodiment, the dialogue module is less than 1 Mb to facilitate communication over a network with limited data transfer capacity.

Figure 2:
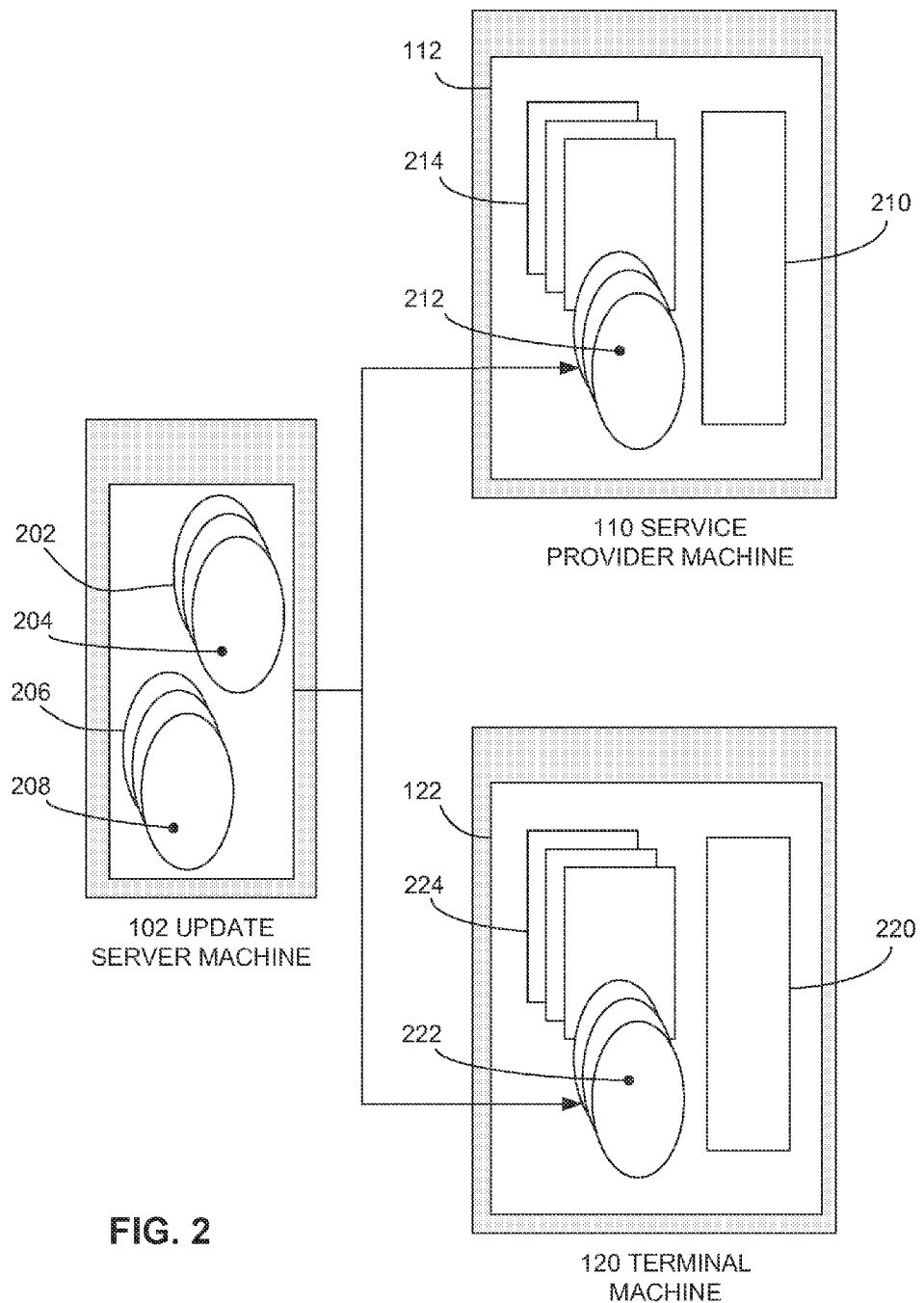
FIG. 2 illustrates the use of a dialogue module in a computerized system.

FIG. 2 illustrates components of a computerized system used to update a dialogue protocol. In one embodiment, an update server machine 102 includes a terminal dialogue module 202 and a service provider dialogue module 206. Each dialogue module 202, 206 may include one or more portions of code or instructions. In this exemplary embodiment, the terminal dialogue module 202 includes terminal code 204 and the service provider dialogue module 206 includes service provider code 208. In some embodiments, the terminal code 204 and the service provider code 208 are the same code.

A dialogue module may be communicated to individual components in the system. The embodiment in FIG. 2 depicts two components, a service provider machine 110 and a terminal machine 120. A dialogue module 206 containing terminal code 208 is communicated to, and stored on, the terminal machine 120. Likewise, a dialogue module 202 containing service provider code 204 is communicated to, and stored on, the service provider machine 110.

In a preferred embodiment, the service provider machine 110 includes a service provider application 112. The service provider application includes a process or processes that allow the service provider machine 110 to conduct the service provider's portion of a dialogue sequence. See FIG. 4 for an example of a dialogue sequence including two machines in a system. In a preferred embodiment, the service provider application 112 includes a computer process for receiving data from a user and is able to update one or more records associated with a dialogue sequence. As shown in FIG. 2, the service provider application 112 may include a platform module 210, a set of computer-executable instructions 214, and service provider code 212.

Figure 10:
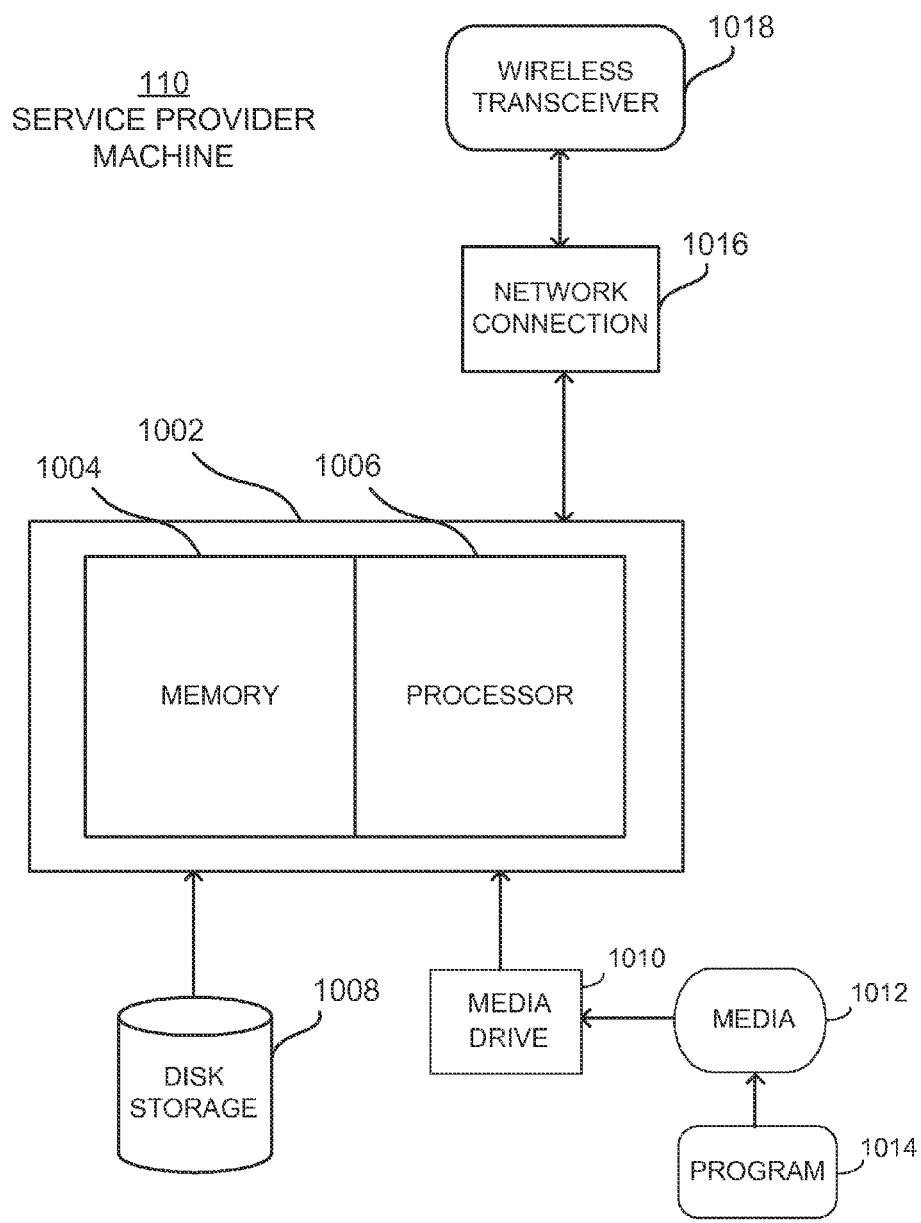
FIG. 10 illustrates an exemplary embodiment of a service provider machine.

In one embodiment, the platform module 210 is also a set of computer-executable instructions that is able to be executed or performed by a service provider machine's computer processor 1006 without additional translation or modification (see FIG. 10 for hardware components of a service provider machine 110). In one embodiment, the platform module 210 is able to interpret the service provider code 212 (stored on the service provider machine 110) so that the code is used when executing the service provider application 112. For example, in some embodiments, the platform module 210 is a virtual machine able to interpret service provider code 212, stored in the form of intermediate code (e.g., Java Byte Code). In other embodiments, the platform module 210 may be another type of executable or computer-executable code that is able to be executed or performed by a service provider machine's computer processor 1006. The platform module 210 may also utilize other computer-executable instructions 214 stored on the service provider machine 110. For example, the platform module may use other dynamically linked libraries or software components.

The service provider application 112 may also include library functions and custom functions that may be referenced by the service provider code 212. For example, in some embodiments, the service provider code 212 may make calls to library or custom functions associated with the service provider application 112.

Similarly, the terminal machine 120 includes a terminal application 122, which allows the terminal machine 120 to conduct the terminal's portion of a dialogue sequence. The terminal application 112 includes a platform module 220, a set of computer-executable instructions 224 and terminal code 222.

Both the service provider code 212 and the terminal code 222 may determine various features of the dialogue protocol including the substantive content of a dialogue sequence (e.g., a sequence of dialogue prompts and user data entries). The code may also determine portions of the graphical user interface presented on a user display. Various features of the dialogue protocol can be modified by downloading a different service provider code 204 and/or terminal code 208 from the update server machine 102.

2. Dialogue Module, Update Sequence

Figure 3A:
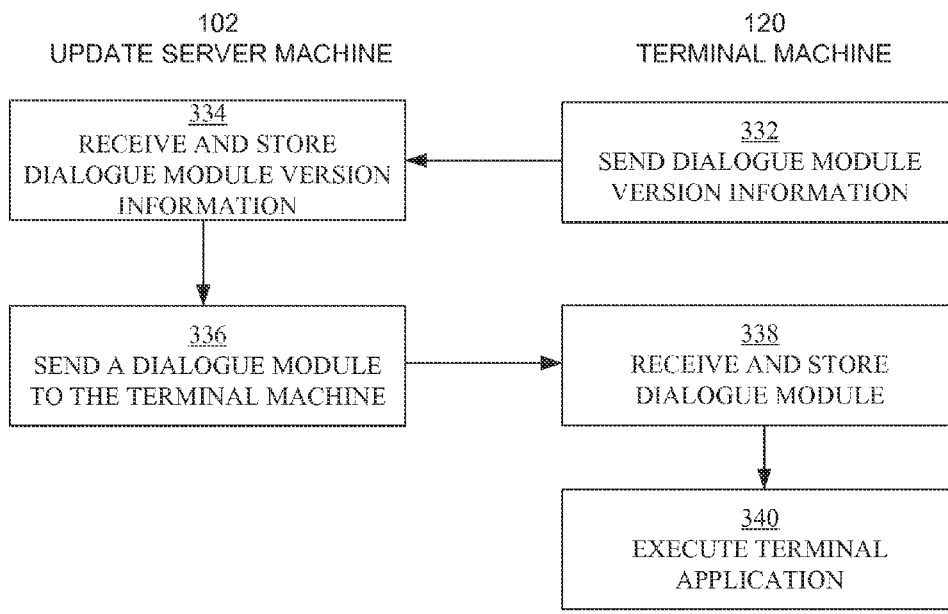
FIG. 3A illustrates a process for updating a dialogue module on a terminal machine using an update server machine.

As described earlier, the dialogue protocol between components in a computerized system may be adapted by uploading a dialogue module. The steps in an exemplary update sequence for uploading a dialogue module to a terminal machine 120 are depicted in FIG. 3A. The following simplified embodiment describes the communication between an update server machine 102 and a terminal machine 120. However, a typical embodiment may include multiple terminal and service provider machines.

In step 332, the terminal machine 120 sends dialogue module version information to the update server machine 102. In some embodiments, the dialogue module version information reflects the version of terminal code that is being used by a terminal application. The version information may be sent in response to an inquiry or request from the update server machine 102. In some embodiments, the dialogue version information may indicate that there is no terminal code currently saved on the terminal machine 120. In an alternative embodiment, the version information is already stored on the update server machine. For example, the version information may be included in a database associating version information with specific terminal machines.

In step 334, the dialogue module version information is received and stored by the update server machine 102. In some embodiments, the version information is associated with the terminal machine 120 and stored in a database including other version information associated with other terminal machines. In some embodiments, the database is used to identify terminal machines that require an updated dialogue module.

For example, a system administrator may specify that one or more terminal machines must support a particular dialogue protocol. The database may be queried by the update server machine 102 to determine which of the terminal machines, if any, currently support that particular dialogue protocol. For those terminal machines that do not support that particular dialogue protocol, the update server machine 102 may determine the dialogue module that is required to enable the particular dialogue protocol. For example, a dialogue module may be selected to provide features and functionality that the terminal device does not currently support.

In step 336, the update server machine 102 sends a dialogue module to the terminal machine 120. The dialogue module may include terminal code and other information to be used by the terminal application. In a preferred embodiment, the dialogue module includes modified terminal code that adapts the terminal application to perform a modified dialogue protocol with a service provider machine. In other embodiments, the dialogue module may include additional or new terminal code that, together with the existing terminal code, provides a specified functionality. In some embodiments, the dialogue module includes information in addition to the terminal code. For example, the dialogue module may include text files, version information or metadata identifying the content of the dialogue module.

In step 338, the dialogue module is received and stored by the terminal machine 120. In one embodiment, the dialogue module replaces existing terminal code already saved on the terminal machine 120. In other embodiments, there may not be any terminal code previously saved on the terminal machine 120. For example, the terminal code previously saved on the terminal machine may be an empty set of code. In some cases, the terminal code may supplement other code previously saved on the terminal machine 120.

The newly transferred terminal code is not compiled on the terminal machine 120. In some embodiments, the terminal code may be intermediate code in the form of Java Byte Code. As described earlier, the intermediate code may be interpreted by a platform module portion of the terminal application. In a preferred embodiment, computer-executable instructions or binary code comprising the platform module or other portions of the terminal application (previously stored on the terminal machine) is not deleted or replaced.

In step 340, the terminal machine 120 executes the terminal application. In a preferred embodiment, on execution, the terminal application uses the terminal code sent to the terminal machine 120 in step 336. The terminal code adapts the terminal application to perform a modified dialogue protocol with the service provider machine 110. The terminal application is able to be executed without recompiling or replacing portions of the computer-executable instructions that are included in the platform module of the terminal application.

Figure 3B:
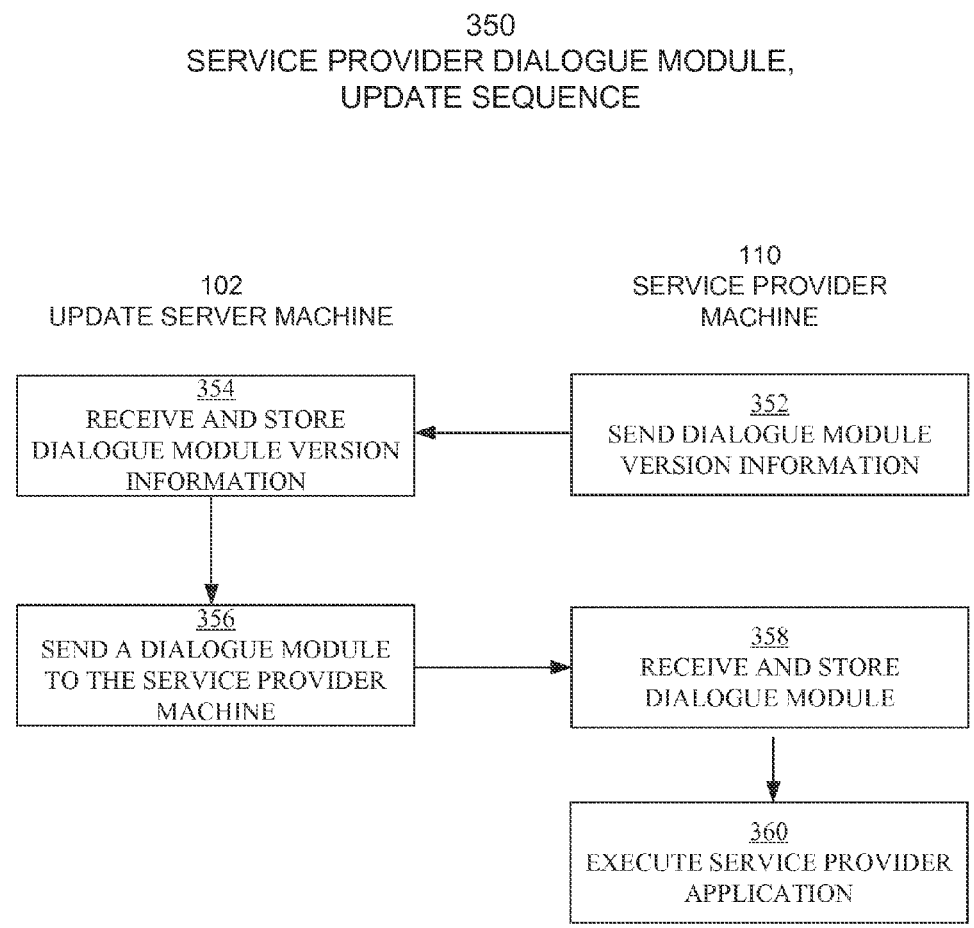
FIG. 3B illustrates a process for updating a dialogue module on a service provider machine using an update server machine.

The steps in an exemplary update sequence for a service provider machine 110 are depicted in FIG. 3B. The following simplified embodiment describes the communication between an update server machine 102 and a service provider machine 110. However, other embodiments may include more than one service provider machine.

In step 352, the service provider machine 110 sends dialogue module version information to the update server machine 102. In some embodiments, the dialogue module version information reflects the version of service provider code that is being used by a service provider application. The version information may be sent in response to an inquiry or request from the update server machine 102. In some embodiments, the dialogue version information may indicate that there is no service provider code currently saved on the service provider machine 110. In an alternative embodiment, the version information is already stored on the update server machine. For example, the version information may be included in a database associating version information with specific service provider machines.

In step 354, the dialogue module version information is received and stored by the update server machine 102. In some embodiments, the version information is associated with the service provider machine 110 and stored in a database including other version information associated with other service provider machines. In some embodiments, the database is used to identify service provider machines that require an updated dialogue module.

For example, a system administrator may specify that one or more service provider machines must support a particular dialogue protocol. The database may be queried by the update server machine 102 to determine which of the service provider machines, if any, currently support that particular dialogue protocol. For those service provider machines that do not support that particular dialogue protocol, the update server machine 102 may determine the dialogue module that is required to enable the particular dialogue protocol. For example, a dialogue module may be selected to provide features and functionality that the terminal device does not currently support.

In step 356, the update server machine 102 sends a dialogue module to the service provider machine 110. The dialogue module may include service provider code and other information to be used by the service provider application. In a preferred embodiment, the dialogue module includes modified service provider code that adapts the service provider application to perform a modified dialogue protocol with a terminal machine. In other embodiments, the dialogue module may include additional or new service provider code that, together with the existing service provider code, provides a specified functionality. In some embodiments, the dialogue module includes information in addition to the service provider code. For example, the dialogue module may include text files, version information or metadata identifying the content of the dialogue module.

In step 358, the dialogue module is received and stored by the service provider machine 110. In one embodiment, the dialogue module replaces existing service provider code already saved on the service provider machine 110. In other embodiments, there may not be any service provider code previously saved on the service provider machine 110. In some cases, the service provider code may supplement other code previously saved on the service provider machine 110.

The newly transferred service provider code is not compiled on the service provider machine 110. In some embodiments, the service provider code may be intermediate code in the form of Java Byte Code. As described earlier, the intermediate code may be interpreted by a platform module portion of the service provider application. In a preferred embodiment, computer-executable instructions or binary code comprising the platform module or other portions of the service provider application (previously stored on the service provider machine) is not deleted or replaced.

In step 360, the service provider machine 110 executes the service provider application. In a preferred embodiment, on execution, the service provider application uses the service provider code sent to the service provider machine 110 in step 356. The service provider code adapts the service provider application to perform a modified dialogue protocol with a terminal machine 120. The service provider application is able to be executed without recompiling or replacing portions of the computer-executable instructions that are included in the platform module of the terminal application.

Figure 4A:
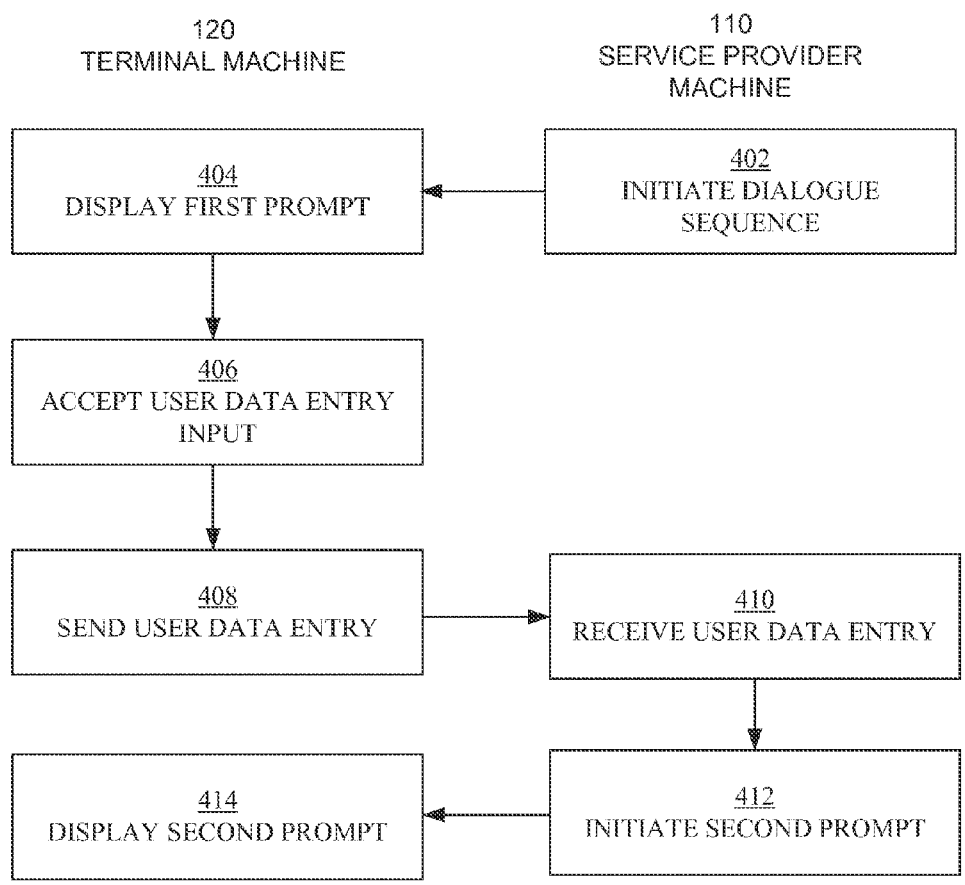
FIG. 4A illustrates a dialogue sequence including a terminal machine and a service provider machine in a continuous communications mode.

3. Dialogue Sequence Including a Terminal Machine and a Service Provider Machine FIG. 4A depicts an exemplary dialogue sequence 400 including a terminal machine 120 and a service provider machine 110 communicating in a continuous mode. The dialogue sequence 400 may include a series of prompts and user data entries as part of an overall dialogue protocol between the terminal machine 120 and the service provider machine 110.

In step 402, the dialogue sequence 400 is initiated by a service provider machine 110. For example, the service provider machine 110 may send a command to the terminal machine 120 to begin a dialogue sequence. In other embodiments, the dialogue sequence 400 may be initiated by the terminal machine 120 or by the user of the terminal machine.

During the initiation of the dialogue sequence 400 one or more initial dialogue parameters may be specified. For example, the initial dialogue parameters may designate a transaction type, language preference, or user authorization code.

The dialogue protocol may require an authorization step at the beginning of the dialogue sequence 400. An authorization step verifies the identity of the user operating the terminal machine 120, and verifies that the user has permission to conduct the dialogue sequence 400. To verify the identity of the user, the system may require the user to input unique information that only the user may know, such as a password, personal identification number ("PIN"), or family name. Additionally or alternatively, the system may require a biometric identifier from a user, such as a fingerprint, eye retinal pattern, or voice signature. Other methods of identifying the user include identifying a device or item that are assumed to be in possession of the user. For example, the system may identify the terminal machine 120 by receiving a serial number, electronic network address, or other electronic data stored on the terminal machine 120. The system may also identify a credit card, smart card or ID card that is scanned into the terminal machine 120 using a card scanning device. The system can verify that the user has permission to conduct the dialogue sequence 400 by comparing the collected user information to a stored record of authorized users.

If the system is operating in a continuous communications mode, the system may require authorization from a service provider before completing a transaction between a user and the service provider. In this example, the authorization occurs at the beginning of the dialogue sequence 400. However, the authorization may also occur during or at the end of the dialogue sequence.

In step 404, the terminal machine 120 displays a first prompt in response to the dialogue sequence 400 being initiated. The type of prompt displayed may depend, in part, on the initial dialogue parameter. For example, the first prompt may be displayed in Spanish, if an initial dialogue parameter specifies that Spanish is the preferred language.

In step 406, the terminal machine 120 accepts data entry input from the user. The data entry input may be any user driven input received from a data entry device 128 (see FIGS. 1 and 9). For example, the data entry input can be one or more character strings entered using a keyboard or keypad. Alternatively, the data entry input may be the coordinates of a user selection corresponding to a location on a terminal display (e.g., a selection using computer mouse). The data entry input could also be an acknowledgement or button press from a data entry device on the terminal machine 120.

In step 408, information regarding the user data entry is transmitted to the service provider machine 110. In this embodiment, the user data entry is sent after the data entry has been accepted by the terminal machine 120. However, if the system is alternating between a continuous and delayed communications mode, the terminal machine may accept two or more data entries before sending the two or more data entries to the service provider machine. For example, the terminal machine 120 may wait until the user has completed a sequence of data entries associated with one transaction before sending the data entries to the service provider machine.

In step 410, information regarding the user data entry is received by the service provider machine 110 and stored in memory. The user data entry may, in part, determine the second prompt in the dialogue sequence. The user data entry may also be used to signal other events or initiate other functionality of the dialogue protocol. As described above, in some embodiments the user data entry may also be received as two or more data entries.

In step 412, a second prompt is initiated by the service provider machine. The initiation of the second prompt may include one or more subsequent dialogue parameters. Similar to the initial dialogue parameters described above, the subsequent dialogue parameters may include a transaction type, language preference, or authorization code. The subsequent dialogue parameter may also specify a subsequent prompt or series of prompts to be presented on the terminal display.

In step 414, the terminal machine 120 displays a second prompt in response to the second prompt 412 being initiated by the service provider machine 110. Similar to the process described above for steps 406, 408 and 410, the terminal machine 120 accepts a second data entry input, sends the second data entry input to the service provider machine 110, which stores the second data entry input in memory.

The steps described above illustrate a simplified example of a dialogue sequence including a terminal machine and a service provider machine communicating in a continuous mode. Other embodiments include multiple prompts and multiple user data entries. In some embodiments a dialogue sequence includes one or more transactions with the user of the terminal machine.

Figure 4B:
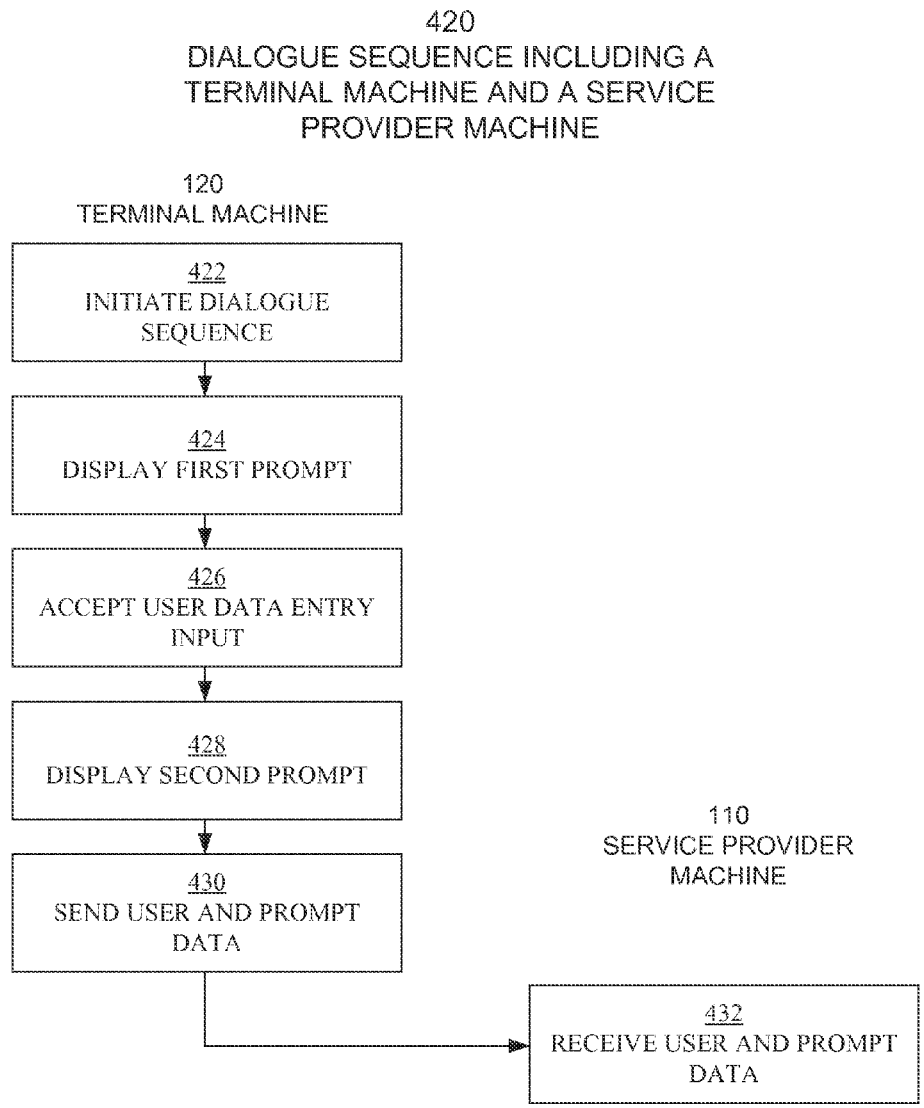
FIG. 4B illustrates a dialogue sequence including a terminal machine and a service provider machine in a delayed communications mode.

FIG. 4B depicts an exemplary dialogue sequence 420 including a terminal machine 120 and a service provider machine 120 communicating in a delayed communications mode. The dialogue sequence 420 may include a series of prompts and user data entries as part of an overall dialogue protocol between the terminal machine 120 and the service provider machine 110.

In step 422, a dialogue sequence is initiated by the terminal machine 120 or by the user of the terminal machine. During the initiation of a dialogue sequence one or more initial dialogue parameters may be specified. For example, the initial dialogue parameters may designate a transaction type, language preference, or user authorization code.

If the system is operating in a delayed communications mode, the system may require authorization from a service provider after completing the dialogue sequence 420. If the dialogue sequence 420 represents a transaction, the authorization may not performed until the transaction has been completed. In this case, the terminal machine 120 collects data associated with the transaction and stores it until it can be transmitted to the service provider machine 110. The authorization with the service provider may occur after the transmission is complete.

In step 424, the terminal machine 120 displays a first prompt in response to a dialogue sequence being initiated. As described above, the type of prompt displayed may depend, in part, on the initial dialogue parameter. In step 426, the terminal machine 120 accepts data entry input from the user. The data is stored by the terminal machine 120 and associated with the first prompt displayed in step 424.

Similarly, in step 428, the terminal machine 120 displays a second prompt in the dialogue sequence 420. The user data entry may, in part, determine the second prompt in the dialogue sequence. The data is stored by the terminal machine 120 and associated with the second prompt. This process is repeated until the dialogue sequence 420 is complete.

Figure 12:
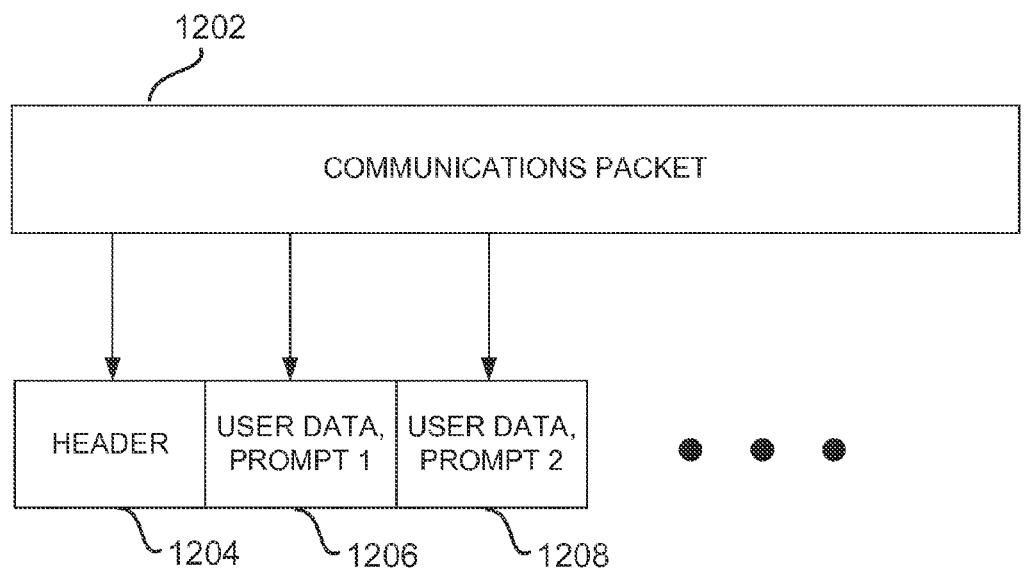
FIG. 12 illustrates an exemplary logical communications packet structure.

In step 430, the combined user data is sent to the service provider machine 110. As described above, in a delayed communications mode, the data may not be transmitted to the service provider machine 110 until a later time when a communication network is available. In some cases, a communications network is available, but the system transmits a group or series of user data entries to reduce network usage. In some cases, the series of prompts associated with the user data are also transmitted in step 430. For example, FIG. 12 depicts an exemplary communications packet that contains a series of prompts and the associated user data.

The steps described above illustrate a simplified example of a dialogue sequence including a terminal machine and a service provider machine communicating in a delayed mode. As described above, a dialogue sequence may also be performed in a mode that alternates between continuous and delayed communication modes.

4. Logical Communications Packet

Communication between the terminal machine and the service provider machine may be performed using a communications packet. FIG. 12 depicts an exemplary communications packet 1202 that may be sent from a terminal machine to a service provider machine, which may start with a header element 1204 followed by a series of user data elements (1206, 1208). In some embodiments, the user data elements (1206, 1208) are associated with a series of prompts that are displayed on the terminal machine. Some prompts may simply provide information to the user without capturing any user data.

As shown in FIG. 12 the header element 1204 may include information including the size of the packet and the number of user data elements. The next element in the communications packet may be a user data element 1206 associated with prompt 1 followed by a user data element 1208 associated with prompt 2. As described above, some prompts may have no user data and may include a null data set.

The dialogue module may specify the header of the communications packet, the size, and locations of the user data elements associated with each screen. This is a "logical" communications packet structure only, and the actual implementation of the communications packet may be different, for example to locate and/or encode the data from the different prompts more efficiently so as to reduce the size of the packet.

In some embodiments, a dialogue module may also define the structure of the communications packet that is communicated between the terminal machine and the service provider machine. New or modified dialogue protocols may require new or modified communications packets between the terminal machine and the service provider machine. For example, in some countries or regions an account may be associated with a person using two last names. In this case, the terminal machine application would have to be modified to accept two last names. The addition of the second last name will require the length of the communications packet to be increased. Also, the structure of the communications packet, including the addition of a new data field (e.g., the use of a second last name) would need to be specified to both the terminal machine and the service provider machine.

In some embodiments, a dialogue protocol may require that new or additional information be sent from the terminal machine to the service provider machine. For example, the number of prompts, the size of the data entries or the type of data entries may change. In this embodiment, the structure of the communications packet would be modified to accommodate new or additional information.

5. Examples of a Terminal Graphical User Interface

Figure 5A:
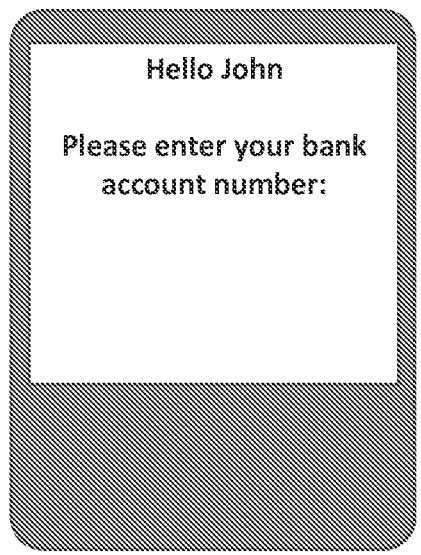
FIG. 5A illustrates an example of a first prompt in a banking dialogue protocol.
Figure 5B:
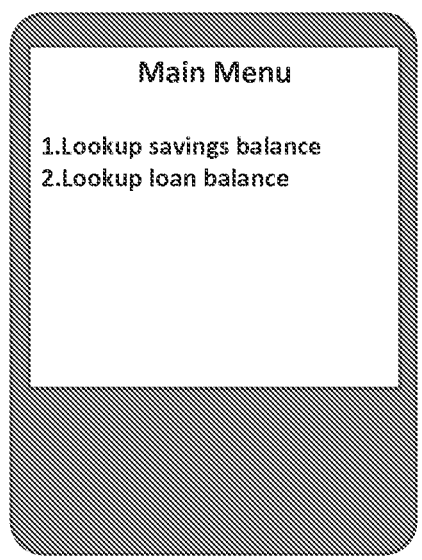
FIG. 5B illustrates an example of a subsequent prompt in a banking dialogue protocol.

FIGS. 5A to 5B depict an example of a series of prompts that may be displayed in a dialogue sequence. This particular series of prompts may be used to guide a user through a banking transaction. These two exemplary prompts are only a portion of a series of prompts that guide a user through an entire transaction.

FIG. 5A depicts an initial prompt presented on a terminal machine display. In some embodiments, one or more initial dialogue parameters may have been used to specify the user's name, the language preference and the type of authorization prompt required. Additionally, properties such as the text of the prompts, prompt sequence, and prompt display may be driven in part by either the terminal code, the service provider code, or both.

To continue to the next prompt, the user must enter an account number using the data entry device on the terminal machine. The initial prompt may also serve as a method of verifying the identity of the user by not allowing the transaction to continue unless a valid account number is entered.

FIG. 5B depicts an exemplary multiple selection prompt. The next prompt in the series may be partially dependent on the selection made by the user.

Figure 6A:
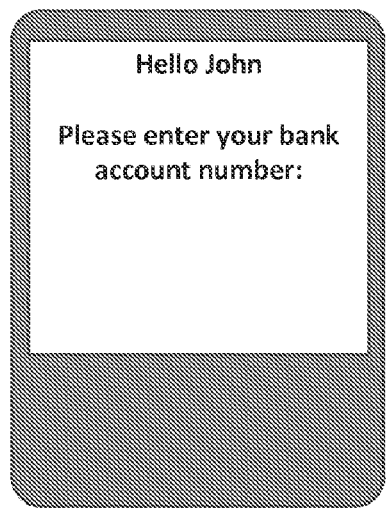
FIG. 6A illustrates an example of first prompt in a banking dialogue protocol.
Figure 6B:
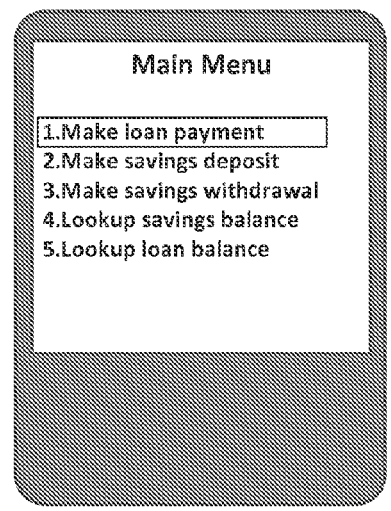
FIG. 6B illustrates an example of a multiple option prompt in a banking dialogue protocol.
Figure 6C:
FIG. 6C illustrates an example of a data entry prompt in a banking dialogue protocol.

FIGS. 6A to 6C illustrate a second example of a series of prompts that may be displayed in a dialogue sequence as part of a dialogue protocol. In some embodiments, the series of prompts in FIGS. 6A to 6C are driven by an updated terminal code or service provider code. For example, a dialogue module may have been downloaded from an update server machine to either a terminal machine, a service provider machine, or both a terminal and a service provider machine. The newly downloaded code may direct, in part, the series of prompts to be displayed.

In FIG. 6A, an initial prompt is displayed greeting the user and requesting a bank account number. In some embodiments, one or more updated initial dialogue parameters may have been used to specify the user's name, the language preference and the type of authorization prompt required. Additionally, properties such as the text of the prompts, prompt sequence, and prompt display may be driven in part by either the terminal code, the service provider code, or both. The initial prompt may be driven, in part, by the newly downloaded code. However, the initial dialogue parameters may be the same as in the example of FIGS. 5A to 5B.

In FIG. 6B, a modified or alternate multiple selection prompt is presented on the terminal machine display. The user may select one of the options presented by making a selection on the terminal display or by entering the corresponding selection number. In this example, the user has selected option 1. FIG. 6C depicts a prompt that is displayed in response to the user's previous selection.

Figure 7A:
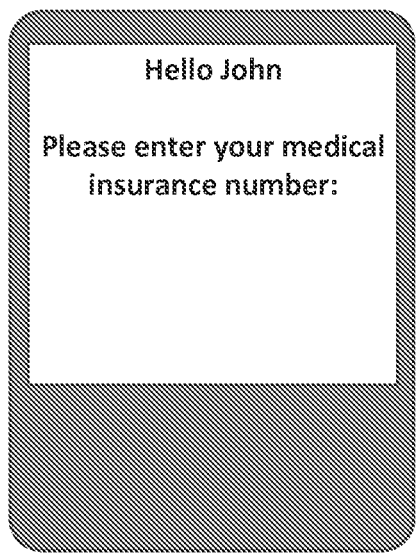
FIG. 7A illustrates an example of a first prompt in a medical dialogue protocol.
Figure 7B:
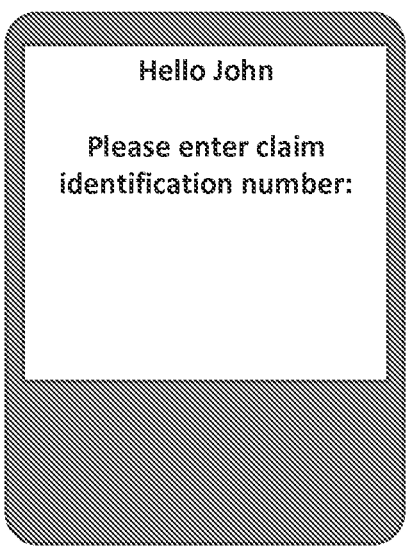
FIG. 7B illustrates an example of a subsequent prompt in a medical dialogue protocol.

FIGS. 7A to 7B depict a third example of a series of prompts that may be displayed in a dialogue sequence. The prompts in FIGS. 7A to 7B may be related to a medical provider transaction. In some embodiments, the sequence of prompts is driven by another dialogue module, downloaded from the update server machine.

6. Modifying the Dialogue Module Using a Design Tool

FIGS. 8A and 8B depict an example of a design tool that can be used to create or modify a dialogue module. As shown in FIG. 8, various features of the dialogue module can be specified. For example, the interface allows a designer to enter the text to be used for a given prompt. Translation of the text may also be provided depending on the languages supported by the dialogue module. Additionally, the designer can select the specific prompts and sequence of prompts to be presented to a terminal user. The designer may also specify the type of user data entry that will be accepted. In some embodiments, a custom or library function may also be specified for the dialogue module.

As shown in FIG. 8B, the design tool may allow the designer to specify the flow of screens. Each screen is a visual depiction of a prompt that is presented to on the terminal machine. The number and order of screens can be modified by the designer. For example, if the user presses the "1" button from this current screen the next screen will be number "0." If the user presses the "ENTER" button from this current screen, then the next screen will be number 442:9

In some embodiments, the settings created using the design tool shown in FIGS. 8A and 8B are used to create or modify terminal code or service provider code. These portions of code may then be included in a dialogue module and downloaded to the appropriate machines in the system using an update server machine. In some embodiments, a version and/or a date may be associated with the code that is created or modified.

The screen shots depicted in FIGS. 8A and 8B are merely an example of a tool that can be used to generate a dialogue module. In the alternative, the dialogue module may be created or modified directly by changing the terminal or service provider code.

7. System Machines

Figure 9:
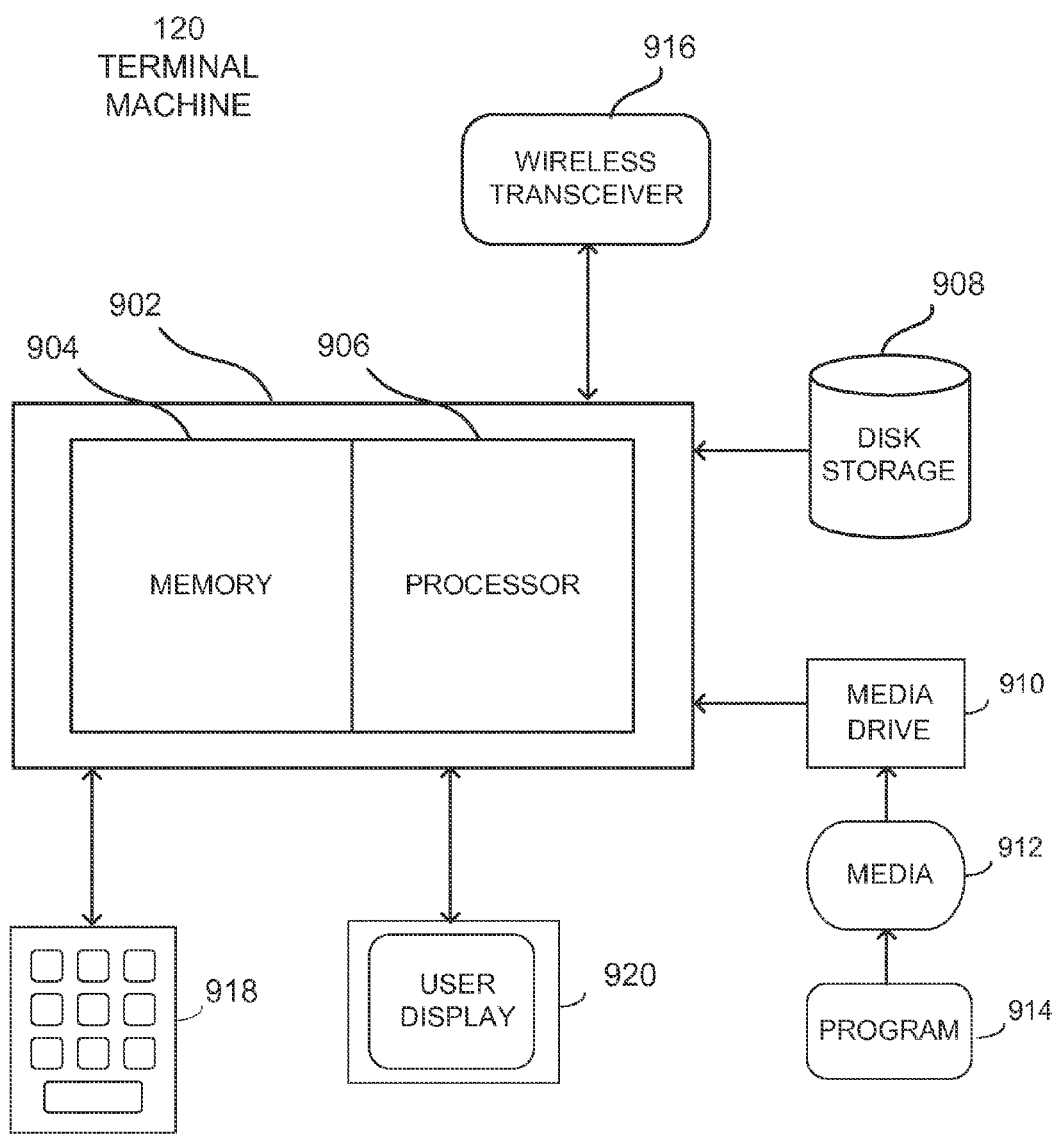
FIG. 9 illustrates an exemplary embodiment of a terminal machine.
Figure 11:
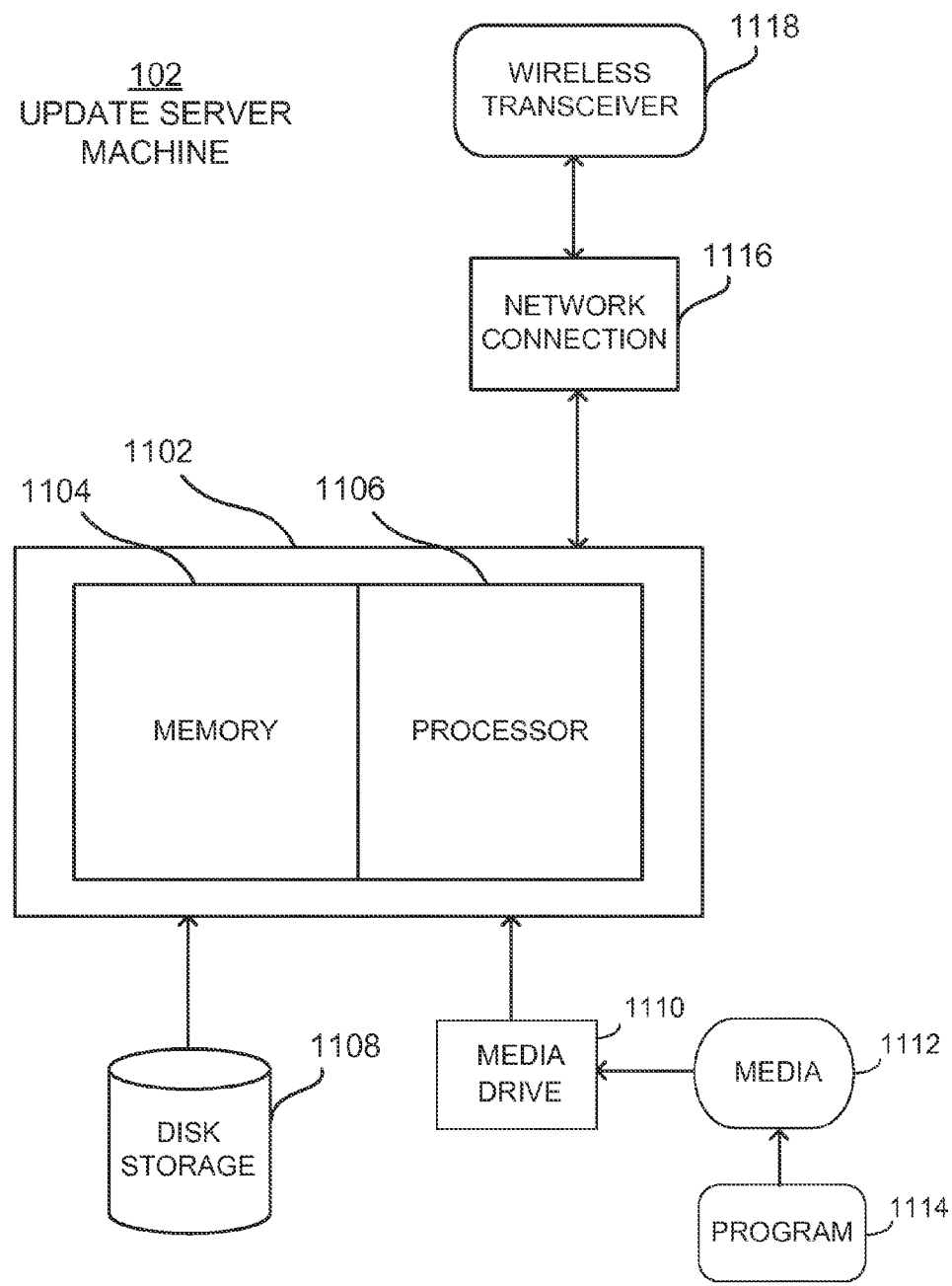
FIG. 11 illustrates an exemplary embodiment of an update server machine.

FIGS. 9 to 11 depict exemplary embodiments of the machines used in one embodiment of a computerized system for updating a dialogue protocol. These embodiments are not intended to be limiting and the machines include additional elements not depicted.

FIG. 9 depicts an exemplary embodiment of a terminal machine 120. The terminal machine 120 includes a computer component 902 that includes at least one processor 906 and computer memory 904. The computer component 902 is able to communicate with persistent memory devices, such as disk storage 908 and a media drive 910. The media drive 910 is able to accept removable media 912 which may include one or more programs 914 or other stored instructions. The terminal machine 120 also includes a wireless transceiver 916 for communicating with a wireless network. In some embodiments, the wireless transceiver 916 is able to communicate with a CDMA or GSM telecommunications network.

The terminal machine 120 also includes a user display 920 and a data entry device 918. In some embodiments the user display 920 is an LCD screen or similar device that is capable of displaying the user interface described above. In a preferred embodiment, the data entry device 918 may be a keypad, keyboard or other multi-button device. In some embodiments, the data entry device 918 includes other devices, such as a computer mouse or other pointing device. For example, the data entry device 918 can also include a touch screen device integrated with the user display 920.

FIG. 10 depicts an embodiment of a service provide machine 110. The service provider machine 110 includes a computer component 1002 that includes at least one processor 1006 and computer memory 1004. The computer component 1002 is able to communicate with persistent memory devices, such as disk storage 1008 and a media drive 1010. The media drive 1010 is able to accept removable media 1012, which may contain one or more programs 1014 or other stored instructions. The service provider machine 110 also includes a network connection 1016. The network connection 1016 may include a TCP/IP wired connection and/or a wireless device, such as a wireless modem. Through the network connection 1016, the service provider machine 110 is able to communicate with a wireless transceiver 1018. In some embodiments, the service provider machine 110 is networked directly with the wireless transceiver 1018. In other embodiments, the service provider machine 110 is connected to a wireless transceiver 1018 through an external network (not shown). For example, the service provider machine 110 may connect to the Internet or other telephony network to access a wireless transceiver that is part of a telecommunications network. In this embodiment, the wireless transceiver may be a base station in a telecommunications network. In some embodiments, the wireless transceiver 1018 is able to communicate with a CDMA or GSM telecommunications network.

FIG. 11 depicts an embodiment of an update server machine 102. The update server machine 102 includes a computer component 1102 that includes at least one processor 1106 and computer memory 1104. The computer component 1102 is able to communicate with persistent memory devices, such as disk storage 1108 and a media drive 1110. The media drive 1110 is able to accept removable media 1112, which may contain one or more programs 1114 or other stored instructions. The update server machine 102 also includes a network connection 1116. The network connection 1116 may include a TCP/IP wired connection and/or a wireless device, such as a wireless modem. Through the network connection 1116, the update server machine 102 is able to communicate with a wireless transceiver 1118. In some embodiments, update server machine 102 is networked directly with the wireless transceiver 1118. In other embodiments, the update server machine 102 is connected to a wireless transceiver 1118 through an external network (not shown). For example, the update server machine 102 may connect to the Internet or other telephony network to access a wireless transceiver that is part of a telecommunications network. In this embodiment, the wireless transceiver may be a base station in a telecommunications network. In some embodiments, the wireless transceiver 1118 is able to communicate with a CDMA or GSM telecommunications network.

Although only certain exemplary embodiments of this invention have been described in detail, those skilled in the art will readily appreciate that many modifications are possible in the exemplary embodiments without materially departing from the novel aspects of the described embodiments. For example, aspects of embodiments disclosed above can be combined in other combinations to form additional embodiments. Accordingly, all such modifications are intended to be included within the scope of this invention.

I claim:

1. A method of conducting a dialogue between a terminal machine and a service provider machine, the method comprising:
    displaying a first prompt on a terminal display of a terminal machine by running a terminal application, the terminal application comprising first computer-executable instructions and first code that conduct the terminal machine's portion of the dialogue;
    accepting a first data entry at the terminal machine, wherein the first data entry is associated with the first prompt;
    communicating information from the terminal machine to the service provider machine, the information associated with the first data entry, the service provider machine using a provider application, the provider application comprising second computer-executable instructions and second code that conduct the service provider machine's portion of the dialogue; and
    receiving, at the terminal machine, a terminal dialogue module that replaces at least a portion of the first code to produce first updated code, wherein the first updated code adapts the terminal application to display a second prompt for the terminal machine's portion of a modified dialogue sequence with the service provider machine, wherein at least one of the first code, second code, and first updated code comprise Java Byte code.

2. The method of claim 1, further comprising receiving at the provider application a provider dialogue module that replaces at least a portion of the second code to produce second updated code, wherein the second updated code adapts the provider application to conduct the service provider machine's portion of the modified dialogue sequence with the terminal machine.

3. The method of claim 2, wherein the second updated code adapts the provider application to use the second prompt.

4. The method of claim 1, wherein the terminal machine and the service provider machine include different types of processors, wherein the first computer-executable instructions are not able to be executed on the service provider machine, and the second computer-executable instructions are not able to be executed on the terminal machine.

5. The method of claim 1, wherein the first and second computer-executable instructions are fully compiled machine code.

6. The method of claim 1, wherein the first updated code further adapts the terminal machine to use a custom graphical user interface.

7. The method of claim 1, wherein at least one of the terminal dialogue module and the provider dialogue module are provided from an update server machine that is separate and distinct from the terminal machine and the service provider machine.

8. The method of claim 1, wherein at least one of the terminal dialogue module and the provider dialogue module are provided by the service provider machine.

9. The method of claim 1, wherein the terminal dialogue module is selected based on an identification of the user of the terminal machine.

10. The method of claim 1, wherein the terminal dialogue module is selected based on input and output (I/O) capabilities of the terminal machine.

11. The method of claim 1, wherein one or more of the terminal dialogue module and the provider dialogue module are selected based on version identification information related to either the first or the second code, respectively.

12. The method of claim 1, wherein the provider application is capable of sending return information to the terminal machine.

13. The method of claim 1, wherein either the first or second set of updated code modifies a logical structure associated with a communications packet, the communications packet adapted to communicate at least one data entry from the terminal machine to the service provider machine.

14. The method of claim 1, wherein the service provider stores for analysis at least a portion of the information associated with the first data entry.

15. The method of claim 1, wherein at least one of the terminal dialogue module and provider dialogue module are generated using a design tool.

16. A system of conducting a dialogue between a terminal machine and a service provider machine, the system comprising:
a terminal machine comprising:
a terminal machine processor;
a terminal machine display; and
memory coupled to the terminal machine processor comprising:
procedures for displaying a first prompt on a terminal display of a terminal machine by running a terminal application, the terminal application comprising first computer-executable instructions and first code that conduct the terminal machine's portion of the dialogue;
procedures for accepting a first data entry at the terminal machine, wherein the first data entry is associated with the first prompt;
procedures for communicating information from the terminal machine to the service provider machine, the information associated with the first data entry, the service provider machine using a provider application, the provider application comprising second computer-executable instructions and second code that conduct the service provider machine's portion of the dialogue; and
procedures for receiving, at the terminal machine, a terminal dialogue module that replaces at least a portion of the first code to produce first updated code, wherein the first updated code adapts the terminal application to display a second prompt for the terminal machine's portion of a modified dialogue sequence with the service provider machine, wherein at least one of the first code, second code, and first updated code comprise Java Byte code.

17. The system of claim 16, wherein the provider application receives a provider dialogue module that replaces at least a portion of the second code to produce second updated code, wherein the second updated code adapts the provider application to conduct the service provider machine's portion of the modified dialogue sequence with the terminal machine.

18. The system of claim 16, wherein the terminal machine and the service provider machine include different types of processors, wherein the first computer-executable instructions are not able to be executed on the service provider machine, and the second computer-executable instructions are not able to be executed on the terminal machine.

19. The system of claim 16, wherein the first and second computer-executable instructions are fully compiled machine code.

20. The system of claim 16, wherein at least one of the terminal dialogue module and the provider dialogue module are provided from an update server machine that is separate and distinct from the terminal machine and the service provider machine.

21. The method of claim 16, wherein the at least one of the terminal machine and the service provider machine stores for analysis the information associated with the first data entry.

22. The method of claim 16, wherein at least one of the terminal dialogue module and provider dialogue module are generated using a design tool.

23. A non-transitory computer readable storage medium storing one or more programs, the one or more programs comprising procedures, which when executed by one or more electronic devices conduct a dialogue between a terminal machine and a service provider machine, cause the devices to:
display a first prompt on a terminal display of a terminal machine by running a terminal application, the terminal application comprising first computer-executable instructions and first code that conduct the terminal machine's portion of the dialogue;
accept a first data entry at the terminal machine, wherein the first data entry is associated with the first prompt;
communicate information from the terminal machine to the service provider machine, the information associated with the first data entry, the service provider machine using a provider application, the provider application comprising second computer-executable instructions and second code that conduct the service provider machine's portion of the dialogue; and
receive, at the terminal machine, a terminal dialogue module that replaces at least a portion of the first code to produce first updated code, wherein the first updated code adapts the terminal application to display a second prompt for the terminal machine's portion of a modified dialogue sequence with the service provider machine, wherein at least one of the first code, second code, and first updated code comprise Java Byte code.

\* \* \* \* \*